March 1, 1966     E. FRISCH     3,238,361
DIGITAL ANGLE MEASURING SYSTEM
Filed June 18, 1962
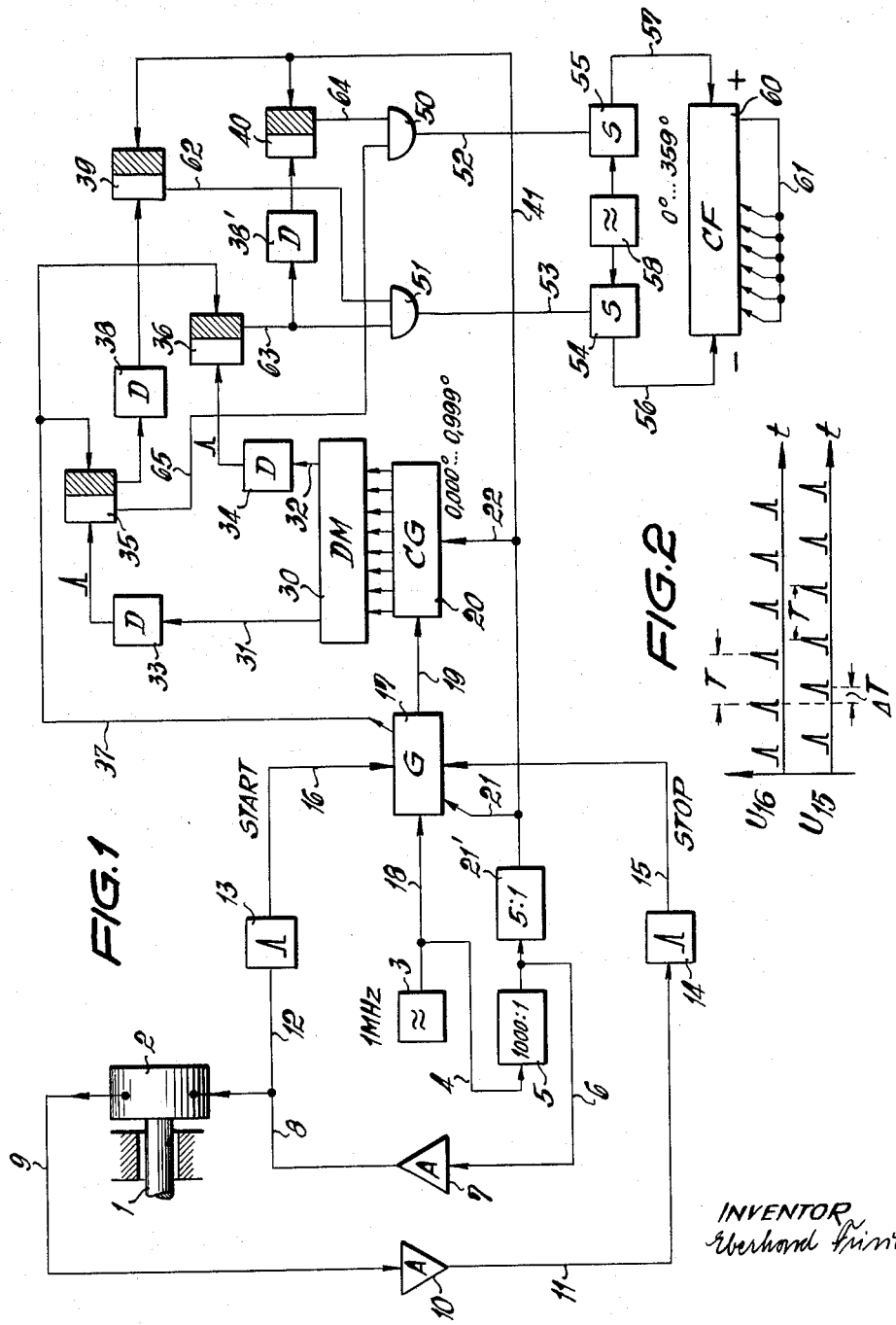
INVENTOR
Eberhard Frisch United States Patent Office 3,238,361
Patented Mar. 1, 1966

3,238,361
DIGITAL ANGLE MEASURING SYSTEM
Eberhard Frisch, Berlin-Waidmannslust, Germany, assignor to Continental Elektroindustrie Aktiengesellschaft, Askania-Werke, Berlin-Mariendorf, Germany, a corporation of Germany
Filed June 18, 1962, Ser. No. 203,145
Claims priority, application Germany, June 19, 1961, C 24,403
8 Claims. (Cl. 235—154)

This invention relates to apparatus for the digital measurement of angular orientation, and particularly to apparatus of this type which is suitable for determining the angular positions of the rapidly turning shafts of optical target-following instruments in the nature of cine-theodolites.

To measure the angular position of a rotatable shaft it is known to use a transducer cooperating with the shaft to produce a pulse train whose pulse-to-pulse period corresponds, independently of frequency, to one complete, 360° revolution around the circumference of the shaft. By comparing this pulse train with a reference pulse train of the same frequency, and counting off the time which elapses between consecutive pulses in the two trains, the angular position of the shaft can be determined. This is because the time position of any given pulse in the first-mentioned pulse train shifts relative to that of the corresponding pulse in the reference pulse train by a fraction of the pulse-to-pulse period which corresponds to the angle of shaft rotation.

In one known arrangement of this type, the shaft whose position is to be determined has at one point on its circumference an index mark which is periodically sensed by a sensing element rotating about the shaft. The sensing element therefore produces a pulse train whose frequency depends only on the element's own speed of rotation, and whose periodicity corresponds always to one complete, 360° revolution of this element about the shaft. When the shaft itself turns this pulse train shifts relative to a reference pulse train of the same frequency by a fraction of the pulse-to-pulse period corresponding to the angular displacement of the shaft. Consequently this displacement can be determined by counting off the magnitude of the aforesaid shift.

The accuracy of measurement of such a device is known to be limited. To overcome this limitation it has been proposed to produce an additional pulse train whose pulse-to-pulse period equals a proper fraction (i.e., one less than unity) of one complete, 360° revolution about the circumference of the shaft, again independently of its frequency. By comparing this additional pulse train with its own reference pulse train in separate comparison means a "fine" or vernier measurement of angular position can be obtained. Together, the values indicated by the two measuring means, namely the coarse and the fine, or vernier values, yield the desired angle. Of course, in such a system means had to be provided to correct the angle indication produced by the coarse measuring system in accordance with the vernier value.

The need existing in such a system for two or more transducers cooperating with the shaft to produce the coarse and vernier measurement pulse trains plus the need to provide means for correcting the coarse measurements by the vernier measurements led to undesirable equipment complexity. For that reason a single transducer, productive only of a vernier pulse train, is sometimes used, the resulting ambiguities in the measured value of angular position being resolved in the electronic portion of the equipment.

In one known form of this latter type of system a single pulse train, whose pulse-to-pulse period corresponds, for example, to an angular displacement of one degree about the circumference of the shaft whose position is to be measured, is supplied to a frequency divider which divides it down in frequency by a factor of 360, yielding a pulse train whose pulse-to-pulse period equals one complete 360° revolution about the shaft. This then constitutes the coarse-measurement pulse train, which can be used in conjunction wtih the vernier pulse train and suitable correcting means to determine the coarse and vernier values of angular shaft position.

This latter type of known system is unsuitable for determining the different angular positions of a rotating shaft if these are assumed in rapid succession. To be suitable for such cases the pulse-to-pulse period of the coarse-measurement pulse train, which is about two orders of magnitude greater than that of the vernier pulse train, should be shorter than the time which elapses between two consecutive angle measurements. Moreover the pulse-to-pulse period of the vernier pulse train should be measurable with great accuracy. Consequently the auxiliary oscillators used in conjunction with suitable electronic counters to perform the vernier angle measurement must operate at frequencies which are extremely difficult to handle by means of conventional pulse counters. Furthermore, the discrete character of the successive measurements and the finite length of the time interval required to perform each one of them, often makes it necessary, when using instruments of this general type with very rapidly turning shafts, to provide equipment for correcting each measurement for errors resulting from both angular velocity and acceleration. When the coarse- and vernier-measurement means are distinctively different, this last requirement can be met only with great difficulty.

Accordingly, it is a primary object of this invention to provide means for determining the angular position of rotatable shafts—even those capable of rotating rapidly in either direction—which are free of one or more of the above-noted limitations.

It is another object to provide such means which employ only a single transducer cooperating with the shaft to produce a vernier pulse train.

These and other objects which will appear are achieved in accordance with the invention by means of a system for performing discrete measurements of the angular position of a rotatable shaft. This system comprises a transducer cooperating with the shaft to produce a pulse train whose pulse-to-pulse period corresponds to a proper fraction of one complete, 360° revolution about the shaft, independently of the frequency of such revolution. The system further comprises a "fine" or vernier measurement means for performing discrete measurements of the time-differential between a given pulse of this venier pulse train and a given pulse in a reference pulse train, and a course-measurement means to perform a coarse measurement to be added to the vernier measurement. The vernier measurement means includes an electronic pulse counting apparatus supplied with pulses from a pulse generator during the above-mentioned time differential which, as noted above, corresponds to the measured vernier value of angular shaft position. The vernier measurement means is arranged to perform its vernier measurement repeatedly at time intervals so related to the maximum angular velocity of the shaft that any two angles measured in succession by said means differ at most by a proper fraction of one whole revolution about the shaft. The pulse counting apparatus is supplemented by apparatus which performs a logical comparison of every two consecutively measured vernier angles and controls the coarse angle indicator in such a way that, when one or the other boundary of a given vernier interval is traversed, the coarse-measurement is corrected automatically and continuously in either a positive or negative sense, as may be appropriate.

The invention is useful in any case in which there is an upper limit on the angular velocity of the shaft whose position is to be measured. In such case discrete, consecutive measurements of the vernier angle can always be performed so close together in time that the shaft has turned in the interim by not more than one coarse-measurement unit. Thus the logical decision circuits supplementing the vernier counting circuits are always able to decide whether a given vernier angle lies within the same coarse-measurement interval as the preceding one or not.

It can also be decided whether the shaft has turned in a positive or negative direction between successive angle measurements. Assume, for example, that the pulse-to-pulse period of the vernier pulse train corresponds to an angular shaft displacement of 1°, that one thousand pulses are counted off by the vernier counting circuits during each such period, and that each said period is regarded (mentally) as being divided into three immediately consecutive partial periods, which may be assumed to the equal in length, for purposes of the present discussion. It is then readily apparent that logical switching circuits, by performing simple "either-or," "or-or," "and-or" or the like comparisons, are able to decide whether a given vernier angle, which must obviously always lie within one of said three partial periods, was reached from the preceding one, by a shaft rotation traversing either the upper or lower boundary of the period, provided care is taken to keep the elapsed time between measurements so short that, even at the maximum angular shaft velocity the two consecutively measured values in question are constrained to lie in immediately adjoining ones of said partial periods.

The following example will make this clear. One vernier measurement period of 1° corresponds to one-thousand pulses in the vernier-measurement counting circuits. This period may be regarded as being composed of three partial periods I, II and III which may be expressed as follows in terms of the pulses constituting the group of 1000 such pulses counted during the entire period:

I: Pulses 000 to 499
II: Pulses 500 to 599
III: Pulses 600 to 999

Successive measurements of the vernier angle are performed at suitably short intervals. It is then apparent that if one of two successively measured angles lies within partial period I, while the preceding one lay within partial period III, this indicates that, in the interim, the shaft has turned in the direction of increasing angular values, e.g. from 160° to 161°. On the other hand, if one of two measured angles lies within partial period III, while the preceding one lay within partial period I, this indicates unambiguously that in the interim the shaft has turned in the direction of decreasing angular values, e.g. from 160° to 159°. Logical switching elements, which compare every two consecutive measured values, are therefore capable of applying a running correction to the indication provided by a digital coarse-measurement system. It should be noted that, in the example explained above, the time interval between successive measurements must be chosen so as to be shorter than the time interval corresponding to partial period II.

Since, in any case, one is limited in the above-noted respect by the shortest of the three partial periods, it is sometimes desirable to divide the vernier-measurement period into three equal partial periods.

For further details reference may be had to the following description, taken in the light of the accompanying drawings, wherein FIGURE 1 illustrates in block diagram form, a prefered embodiment of the invention is applied to a photo-graphically recording, target-following instrument of the form known as cine-theodolites, and FIGURE 2 is an explanatory diagram illustrating some of the signals occurring in the system of FIGURE 1.

Referring now to FIGURE 1, the system there illustrated serves to determine the angular position of the axis of rotation of the above-mentioned instrument. This type of instrument is used for the purpose, among others, of determining the flight paths of rapidly moving objects, such as rockets at take-off, or the like. It comprises a telescope objective, capable of pivoting about two orthogonal axes, and a camera which is coupled to the objective and photographs the said object at intervals, e.g. every $\frac{1}{10}$ second, the angular orientation of each axis of rotation of the objective being concurrently recorded.

The vertical axis of rotation of the cine-theodolite is represented by shaft 1 in FIGURE 1. This axis is coupled to an electro-mechanical transducer 2, which may take any of a variety of known forms, one of which is disclosed in German printed patent application (Ausleges-chrift) No. 1,098,858, filed April 29, 1959, published February 2, 1961, and assigned to the assignee of the present invention. This transducer responds to an alternating input signal to produce an output signal of the same frequency and of a phase which varies in accordance with variations in the angular orientation of shaft 1. For every displacement of shaft 1 through one degree, the phase of the output signal of the transducer undergoes a 360° change linearly related to the angular shaft displacement. Thus the phase of the transducer ouput provides a direct vernier measurement of the angular orientation of shaft 1.

An oscillator 3 of any conventional form produces a signal at a frequency of 1 megacycle, this signal being supplied over lead 4 to the input of a frequency-divider 5. Divider 5 reduces the frequency of the supplied signal by a factor of 1,000, from 1 megacycle to 1 kilocycle. The frequency-divided signal is supplied over lead 6 to amplifier 7. The output of amplifier 7 constitutes the above-mentioned alternating signal supplied via lead 8 to transducer 2.

The output signal from transducer 2, which is the signal used to perform the desired measurement, is supplied over lead 9 to the input of amplifier 10 and from the output of this amplifier to lead 11.

The input and output signals of transducer 2 are supplied, respectively, to pulse-shaping circuits 13 and 14 over leads 11 and 12. Each of these pulse-shaping circuits transforms the signal supplied thereto into a train of sharp pulses, or spikes at the same frequency as, and in fixed phase relationship to the corresponding supplied signal. The output pulses from circuit 13 are supplied to lead 16, while those from circuit 14 are supplied to lead 15.

As shaft 1 turns, the individual pulses constituting the pulse train on lead 15 shift relative to those on lead 16.

Illustrative segments of the two pulse trains in question are shown in FIGURE 2, the lower series of pulses, designated $U_{15}$ in that figure, representing those on lead 15, while the upper series of pulses, designated $U_{16}$, represents those on lead 16. The period between pulses in each train is represented by T, while the time-displacement of one train relative to the other is represented by $\Delta T$.

This displacement $\Delta T$ clearly constitutes a vernier measurement of the angular displacement of shaft 1. When shaft 1 turns through an angle of 1°, the pulses on lead 15 shift by a complete pulse-to-pulse period T relative to the pulse train on lead 16. Lesser or greater shaft displacements produce lesser, or greater pulse train shifts, respectively. This shift therefore provides a vernier measurement of the angular shaft position. However, this measurement only provides an indication of shaft position within one degree, without giving any indication as to which one of the 360 possible degrees of shaft rotation is involved.

The pulses on leads 15 and 16 are supplied to the inputs of gating circuit 17. Circuit 17 is connected in series with a signal path formed by leads 18 and 19 which connect the 1 mc. oscillator 3 to the input of an electronic pulse counter 20, built of bi-stable multivibrators, for example. Gating circuit 17, also designated by reference character G in FIG. 1, may comprise a biased diode which, in its biased-off condition allows no signals from oscillator 3, supplied over lead 18 to gate 17, to pass to lead 19. The bias potential of this diode gating means is controlled by a bistable multivibrator circuit, whose switching state in turn is controlled by pulses on leads 15 and 16, respectively. Pulses on lead 16 render gate 17 signal transmissive (i.e. "open" it), while pulses on lead 15 render it non-transmissive (i.e. "close" it). Gate 17 is so constructed that not every pulse on lead 16 is capable of opening it. Rather the opening of the gate requires the application of a conditioning pulse. When such a pulse reaches gate 17 over lead 21, then the next following pulse on lead 16 opens the gate and the next following pulse on lead 15 closes it again. It then remains closed until after the next conditioning pulse appears on lead 21. Said conditioning pulse opens a second diode gating means which is connected to lead 16. In its normally closed condition this second diode gating means prevents output pulses from pulse forming stage 13 from reaching the above-mentioned bistable multivibrator circuit and thereby controlling the operation of the first-mentioned gating means.

It is apparent that in this arrangement the maximum measurable angular displacement value of 1° corresponds to one thousand pulses reaching counting circuit 20 from oscillator 3. If the time-delay between the start and stop pulse trains applied to gate 17 is shorter than the pulse-to-pulse period T, then a correspondingly reduced number of such pulses reach the counter 20.

In one second of time shaft 1 turns at most through a 30° angle. Therefore the maximum rate $\phi'$ of angular displacement equals 30° per second. The maximum counting range of counter 20 is divided into three parts I, II, and III, expressed in terms of the pulses constituting a complete sequence of 1,000 as follows:

I: Pulses 000 to 199
II: Pulses 200 to 799
III: Pulses 800 to 999

Thus the smallest of the three parts encompasses two hundred counting pulses reaching counter 20. This corresponds to a time interval of $200 \times 10^{-6}$ seconds, or 0.2 millisecond, which is equivalent to a shaft rotation $\phi$ of $=0.2°$. The speed of measurement of the system is therefore chosen so that the maximum time interval which elapses between any two consecutive measurements can be represented by the expression $$\frac{\phi}{\phi'} = \frac{0.2}{30° \text{ sec.}^{-1}} = \frac{1}{150} \text{ sec.} = 6.7 \text{ milliseconds}$$

A suitable time interval is therefore 5 milliseconds, for example. If consecutive measurements are performed at this interval, then any two of them can differ at most by 0.2°.

The output signal from frequency divider 5 is supplied to another frequency divider 21' which divides its frequency down by a further factor of 5. Lead 21 therefore has on it a series of spikes at a repetition rate of 200 per second. This 200 c.p.s. signal from divider 21', which divider may be built up of suitably interconnected bistable multivibrators, is locked in phase via divider 5 with the pulses from generator 3, so that the time differential between a conditioning pulse on lead 21 and the next succeeding starting pulse on lead 16 remains fixed. The 200 c.p.s. series of spikes also serves to reset counter 20 via lead 22, each pulse which occurs at the output of divider 21 serving to reset counter 20 to zero and condition gate circuit 17 for the passage of an angle-measurement pulse train. The next following pulse on lead 16 then opens gate 17, the pulses from generator 3 pass through this gate and over lead 19 to counter 20, where they are counted until the next pulse from lead 15 is applied to gate 17. The count accumulated in counter 20 is available at 5 millisecond intervals, i.e. 200 times per second, so that any two consecutive angle measurements can differ at most by 0.2°.

To determine the coarse angular value, vernier departures from which are measured by counter 20, a diode matrix 30 is connected to the output of counter 20.

This diode matrix has two output leads 31 and 32. On lead 31 a unidirectional potential is developed whenever the instantaneous value in the hundreds decade of counter 20 represents the numeral "two." On lead 32 a unidirectional potential is developed only when said instantaneous value represent the numeral "eight." The transitions in the unidirectional potential on these two leads which occur during the counting operation are differentiated by means of differentiating circuits 33 and 34. The spike signals resulting from these differentiations are supplied to bi-stable multivibrators 35 and 36, respectively.

Upon opening of gate 17, each of these multivibrators is caused, via lead 37, to assume that state in which its left half is non-conductive. This will be referred to hereinafter as its "O" state. If a measured angular value then exceeds the partial period I of the measurement interval, multivibrator 35 is flipped by means of the signal on lead 31 so that its left half becomes conductive, which will be referred to hereinafter as its "L" state. Multivibrator 36 reacts in the same way when the measured angular value lies within partial period III of the vernier measurement interval. The states of the two multivibrators therefore indicate in which of the three possible partial periods the total count accumulated in counting circuit 20 lies. The possible "O" and "L" states of these multivibrators 35 and 36 are tabulated below opposite the partial measurement periods I, II and III to which they correspond, respectively:

|     | 35 | 36 |
| --- | --- | --- |
| I   | O  | O  |
| II  | L  | O  |
| III | L  | L  |

This tabulation shows that if multivibrator 35 is in state "O" and multivibrator 36 in state "L" at the end of a counting period, then the measured value lies within part I of the total possible range of values. State "L" of multivibrator 35, simultaneously with state "O" of multivibrator 36, denote a location of the measured value in part II. Finally the existence of state "L" in both multivibrators indicates a measured value in part III.

The outputs of the two multivibrators 35 and 36 are connected via additional differentiating networks 38 and 38' to the two bistable multivibrators 39 and 40, the former being coupled to the right half of multivibrator 35 and the latter to the right half of multivibrator 36. Both of multivibrators 39 and 40 are normally in that state in which their left halves are non-conducting, which will be referred to herein as their "O" state. To place them into that state following each measurement the conditioning pulse for gate 17 is also supplied to each of them with appropriate delay via lead 41.

An "AND" circuit 50 is connected to the outputs of multivibrators 35 and 40, while an "AND" circuit 51 is connected to the outputs of multivibrators 36 and 39. These "AND" circuits deliver unidirectional potentials to leads 52 and 53, respectively, whenever the multivibrator circuit halves from which each of them derives its two input signals are either both conducting or non-conducting. Leads 52 and 53 are connected to gate circuits 54 and 55 which, in turn, are connected in circuit with leads 56 and 57, respectively. Leads 56 and 57 connect a pulse generator 58 with both inputs of a forward-backward counter 60. Circuit arrangements suitable for use as "AND" circuits 50 and 51 are disclosed on page 319 of "Transistor Circuit Engineering" by R. F. Shea, 4th edition, John Wiley and Sons, New York.

The above-described system operates as follows: When gate 17 becomes signal transmissive, the counter 20 is supplied with the counting pulses from generator 3, whose total number represents the vernier measurement value. At the same time multivibrators 35 and 36 will be replaced to their "O" state and the result of the last measurement is transferred to multivibrators 39 and 40 respectively. Depending upon the total count reached by counter 20, matrix 30 triggers multivibrators 35 and 36 so that their combined states indicate, in accordance with the tabulation given above, in which of the three possible parts the total lies. Multivibrators 39 and 40 cooperate similarly to indicate in which part the immediately preceding total lay. If this prior total was in part III, for example, and the subsequent total in part I, then "AND" circuit 51, by rendering signal transmissive gate 54, applies one or more pulses from source 58 to the input of counter 60, so that the coarse-measurement value is changed by one unit in a positive direction. On the other hand, if the prior measurement was in part I and the subsequent one in part II, then gate circuit 55 is rendered transmissive by means of "AND" circuit 50. One or more counting pulses from generator 58 are then applied to counter 60 via lead 57 and the coarse-measurement value changed by one unit in a negative direction. Successive vernier measurements made by counter 20 which correspond to transistions between parts I and II, or II and III, leave the coarse measurement indicated by counter 60 unchanged.

When gate 17 becomes signal transmissive a pulse is supplied to storage multivibrators 35 and 36 via lead 37 which either triggers them into their normal state, or leaves them in that state if they were previously in it. The interval between the occurrence of a pulse on lead 37 and one on lead 41 is then available to perform the required comparison between consecutive measured values.

Counter 60 is so constructed that it can register only numbers from 0° to 359°. When either the upper or the lower limit of its counting range is reached it is appropriately reset to zero via lead 61.

The pulses indicated as being produced by generator 58 consist preferably of a train of pulses derived from frequency divider 21' and phase displaced relative to those on leads 21 and 41.

Thus the sum of the totals indicated by counters 20 and 60 yields, 200 times per second, the angle of orientation of the shaft 1. By synchronizing the shutter opening of the cine-theodolite camera, which occurs 10 times per second, with the stop-pulse of gate 17, the said sum can be made to correspond substantially to the angles of shaft orientation at the instants of shutter openings. These time-coincident sums can be stored in appropriate storage elements, for later utilization. This storage may be accomplished by means of punched cards, magnetic tape, photographic film, or the like.

It should be noted that errors in two consecutive vernier measurements can lead to a cumulative error which is preserved by the measuring system, whereas an error in only one vernier measurement is automatically corrected in the next. This automatic correction occurs when part II referred to above is at least twice as great as the sum of parts I and III.

It is also sometimes desirable to provide means for correcting such errors. For this purpose a self-correcting counter, such as a ring counter, may be used as the coarse-measurement counter. Logic circuits can also be used to correct the counting of both counters 20 and 60. This is accomplished by indicating counting errors on the record of individual measured values.

It will be understood that the invention is not limited to the specific embodiment described above. For example, it is not essential that the vernier-measurement pulse train be generated in the manner indicated. Instead it is possible to produce this pulse train by means of an electric, photoelectric, or magnetic sensor which, during rotation of the shaft, senses 360 indicators mounted on the circumference of the shaft. The system according to the invention is capable to determine the position of all movable members which move in forward and backward direction by use of a single transducer which produces a pulse train, whose period will give in connection with the period of a reference pulse train information about a vernier value of the position to be measured only.

I claim:

1. A system for making discrete measurements of the angular orientation of a rotatable shaft comprising a transducer cooperating with said shaft to produce a pulse train whose pulse-to-pulse period corresponds independently of its frequency to a proper fraction of a complete 360° revolution around the circumference of said shaft, means for producing a reference pulse train for said first-mentioned pulse train, vernier-measurement means for making discrete measurements of the time-differential between a pulse in said first-mentioned pulse train and a pulse in a reference pulse train to determine the vernier value of said orientation, coarse-measurement means for determining the coarse value of said orientation with respect to which said vernier value is determined by said vernier-measurement means, said vernier-measurement means including a measuring pulse generator means, electronic pulse counting means supplied with a measuring pulse train derived from said measuring pulse generator during a time interval corresponding to said vernier orientation value, means for initiating said discrete measurements of vernier angle value repeatedly in such relation to the maximum rate of rotation of said shaft that any two consecutive vernier angle measurements differ at most by proper fractions of said complete 360° revolution, and means for logically comparing successive ones of said vernier values, said comparing means controlling said coarse-measurement means in such a manner that in response to traversal of one of the two limits of said vernier-measurement interval between performances of successive vernier measurements, the coarse orientation value indicated by said coarse-measurement means is automatically changed by one unit in a positive or negative sense.

2. The system of claim 1 further characterized in that said vernier measurement means is coupled to means for storing each said measured vernier value and to means for comparing said stored value with the next following measured value, and in that said coarse-measurement means comprises forward-backward counter means for counting pulses supplied thereto.

3. The system of claim 1 further characterized in that said first-mentioned pulse train is produced by an electromechanical transducer coupled to said shaft, said transducer being responsive to the application of an alternating signal to produce an alternating signal whose phase varies in proportion to variations in angular shaft orientation, and by pulse forming means responsive to said produced alternating signal to form a pulse train at the same frequency as said last-named signal.

4. A system for repeatedly measuring the angular orientation of a rotatable shaft, said system comprising:

means for producing a series of pulses whose pulse-to-pulse period is independent of their rate of occurrence and whose times of occurrence vary in accordance with variations in said orientation;

means for repeatedly comparing said series of pulses with a series of reference pulses having the same rate but fixed times of occurrence; and means for comparing two successive ones of said repeated comparisons to derive an indication of the difference between them.

5. The system of claim 4 characterized in that said means for comparing said series of pulses comprises a source of periodic pulses whose rate of occurrence is many times greater than that of said series of reference pulses, a pulse counting means, and means for applying said periodic pulses to said counting means during intervals between pulses in one said series and the immediately following pulse in the other of said series.

6. The system of claim 5 further characterized in that said counting means responds to the pulses applied thereto during each said interval to accumulate a count corresponding to their number.

7. The system of claim 6 further characterized in that said means for comparing said comparisons comprises means for sensing predetermined transitions in the count accumulated by said counting means between succeeding ones of said intervals.

8. In a device for determining the position of a member movable in forward and backward direction: an electro-mechanical transducer operationally connected with the member for producing a first pulse train, the time interval between one impulse of said first train and an impulse of a second reference impulse train of the same frequency being a vernier measure of the position of said member corresponding to a proper fraction of a coarse measure value of the position to be measured, a generator for producing counting impulses, counting means and gating means between the generator and said counting means; sensing means for initiating periodically the gating means to count the time interval between said impulses; storing means to store successive measurements of the counting means, comparing means to compare logically said stored measurements, coarse-counting means operationally connected with the storing means and being controlled by said comparing means in such a manner that in response to traversal of one of the two limits of said time interval between performances of successive vernier measurements, the coarse position value indicated by said coarse-counting means is automatically changed by one unit in a positive or negative sense depending on the direction of the motion of the member between successive counts of the vernier counting means.

References Cited by the Examiner

UNITED STATES PATENTS

| 2,930,033 | 3/1960 | Webb | 340—347 |
| 2,936,447 | 5/1960 | Kirkhead et al. | 340—347 |
| 2,980,900 | 4/1961 | Rabin | 340—347 |
| 3,068,456 | 12/1962 | Nevius | 340—347 |

MALCOLM A. MORRISON, *Primary Examiner.*